United States Patent
Lo

(10) Patent No.: US 10,425,794 B2
(45) Date of Patent: *Sep. 24, 2019

(54) SYSTEM AND METHOD FOR SECURE PAIRING OF BLUETOOTH DEVICES

(71) Applicant: BBPOS Limited, Hong Kong (HK)

(72) Inventor: Chi Wah Lo, Hong Kong (HK)

(73) Assignee: BBPOS Limited, Tsuen Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,598

(22) Filed: Jul. 26, 2018

(65) Prior Publication Data

US 2018/0338235 A1 Nov. 22, 2018

Related U.S. Application Data

(63) Continuation of application No. 15/832,982, filed on Dec. 6, 2017, now Pat. No. 10,064,040, which is a
(Continued)

(51) Int. Cl.
*H04W 4/80* (2018.01)
*H04B 7/26* (2006.01)
(Continued)

(52) U.S. Cl.
CPC ............ *H04W 4/80* (2018.02); *G06F 1/3234* (2013.01); *H04B 7/26* (2013.01); *H04L 63/0428* (2013.01);
(Continued)

(58) Field of Classification Search
CPC ...... H04W 4/80; H04L 63/083; G06F 1/3234; Y02D 70/144
(Continued)

(56) References Cited

U.S. PATENT DOCUMENTS 9,344,185 B2 * 5/2016 Lo ........................... H04W 4/80
10,064,040 B2 * 8/2018 Lo ....................... H04L 63/0428
(Continued)

FOREIGN PATENT DOCUMENTS

| CN | 1561011 A | 1/2005 |
| CN | 202261285 U | 5/2012 |
| WO | 2012170254 A1 | 12/2012 |

OTHER PUBLICATIONS

International Search Report and Written Opinion of the International Searching Authority from PCT/CN2014/074156, dated Jul. 9, 2014 (related application).
(Continued)

*Primary Examiner* — Ayodeji O Ayotunde

(57) ABSTRACT

A mobile device includes a Bluetooth transceiver, the Bluetooth transceiver being in an idle power state when not securely paired to a second Bluetooth transceiver of a peripheral device. The mobile device further includes an audio interface, the audio interface coupled to the Bluetooth transceiver, the audio interface configured to connect to a second audio interface of the peripheral device. The mobile device is configured to establish an out-of-band audio communication channel to the peripheral device by connecting the audio interface to the second audio interface, the mobile device configured to exchange Bluetooth authentication data with the peripheral device via the out-of-band audio communication channel in response to transitioning to an operating state, the mobile device configured to initialize the Bluetooth transceiver with the Bluetooth authentication data to establish an authenticated and cryptographically protected in-band Bluetooth communication channel allowing the mobile device to be securely paired with the peripheral device.

20 Claims, 2 Drawing Sheets

Related U.S. Application Data continuation of application No. 15/098,844, filed on Apr. 14, 2016, now Pat. No. 9,866,991, which is a continuation of application No. 14/222,756, filed on Mar. 24, 2014, now Pat. No. 9,344,185.

(60) Provisional application No. 61/805,538, filed on Mar. 27, 2013.

(51) Int. Cl.
| | | |
|---|---|---|
| *H04W 12/04* | (2009.01) | |
| *H04W 12/06* | (2009.01) | |
| *G06F 1/3234* | (2019.01) | |
| *H04L 29/06* | (2006.01) | |
| *H04W 52/02* | (2009.01) | |
| *H04W 12/00* | (2009.01) | |
| *H04W 8/00* | (2009.01) | |
| *H04W 84/18* | (2009.01) | |

(52) U.S. Cl.
CPC ......... *H04L 63/083* (2013.01); *H04W 12/003* (2019.01); *H04W 12/04* (2013.01); *H04W 12/06* (2013.01); *H04W 52/0229* (2013.01); *H04L 63/18* (2013.01); *H04W 8/005* (2013.01); *H04W 12/00504* (2019.01); *H04W 84/18* (2013.01); *Y02B 70/30* (2013.01); *Y02B 70/32* (2013.01); *Y02D 70/00* (2018.01); *Y02D 70/142* (2018.01); *Y02D 70/144* (2018.01); *Y02D 70/146* (2018.01); *Y02D 70/449* (2018.01)

(58) Field of Classification Search
USPC ........................................................ 455/41.2
See application file for complete search history.

(56) References Cited

U.S. PATENT DOCUMENTS

| | | |
|---|---|---|
| 2005/0114714 A1 | 5/2005 | Albulet |
| 2006/0251256 A1 | 11/2006 | Asokan et al. |
| 2008/0268776 A1* | 10/2008 | Amendola ............ H04W 12/06 455/41.2 |
| 2012/0309289 A1 | 12/2012 | Walsh et al. |

OTHER PUBLICATIONS

CN: Office Action of CN 201480018746.3 (related application); dated Aug. 1, 2018; 10 pages.
CN: Office Action of CN 201480018746.3 (related application); dated Feb. 19, 2019; 7 pages.

* cited by examiner

SYSTEM AND METHOD FOR SECURE PAIRING OF BLUETOOTH DEVICES

CROSS-REFERENCE TO RELATED APPLICATIONS

This application is a Continuation of U.S. patent application Ser. No. 15/832,982, filed on Dec. 6, 2017, entitled SYSTEM AND METHOD FOR SECURE PAIRING OF BLUETOOTH DEVICES, which published on Apr. 5, 2018 as U.S. Publication No. 2018-0098186. Application Ser. No. 15/832,982 is a Continuation of U.S. patent application Ser. No. 15/098,844, filed on Apr. 14, 2016, and entitled SYSTEM AND METHOD FOR SECURE PAIRING OF BLUETOOTH DEVICES, which published on Sep. 14, 2017 as U.S. Publication No. 2016-0227358. Application Ser. No. 15/098,844 is a Continuation of U.S. patent application Ser. No. 14/222,756, filed on Mar. 24, 2014, and entitled SYSTEM AND METHOD FOR SECURE PAIRING OF BLUETOOTH DEVICES, published on Jan. 23, 2016 as U.S. Publication No. 2014-0295761, which claims the benefit of U.S. provisional application Ser. No. 61/805,538, filed on Mar. 27, 2013 and entitled SYSTEM AND METHOD FOR SECURE PAIRING OF BLUETOOTH DEVICES. U.S. patent application Ser. Nos. 15/098,844, 14/222,756 and 61/805,538, and U.S. Application Publication Nos. 2016-0227358 and 2014-0295761 are incorporated by reference in their entirety.

TECHNICAL FIELD

The present invention relates to a system and a method for secure pairing of Bluetooth devices using an out-of-band (OOB) audio channel.

BACKGROUND

Portable personal computing devices such as Smartphones, Personal Digital Assistants (PDAs), portable computers, tablet computers and audio devices such as digital music players have become ubiquitous in recent years. These devices usually have different built-in physical electrical interfaces such as USB, FireWire, RS232 serial port and audio plug, among others. In almost all of these devices, and in particular in the audio devices, the audio plug is a common interface. The audio plug of a device acts as a receptacle for an audio jack connector which is used for transmitting analog signals including audio signals. The audio plug is used to connect to headphones, speakers, microphones, and hands-free devices, among others.

In the past, many mobile phones used to have their own proprietary form of audio plugs configured to be used with cables outfitted with matching proprietary audio jacks. However, recently the functionality of mobile phones has changed so much that most mobile phones are now also digital music players, payment devices, navigation devices and cameras, among others. Additional accessory devices including headphones, printers, and card readers, among others, may be connected to the mobile phones in order listen to music, print and complete payments, among others. Therefore, due to these added functionalities and the need to connect additional accessory devices to mobile phones, 2.5 mm audio plugs and/or 3.5 mm audio plugs can now be found on most middle to high-end mobile phones.

Besides wired connections, many portable devices are equipped with wireless connection capabilities such as Bluetooth, Wi-Fi or WiMAX, among others. In a wired connection where the devices are physically connected, the data security is less of a concern. Unlike wired connections, eavesdropping is possible in wireless connections and the data must be cryptographically protected and the two communicating devices must be authenticated with one another. A pairing process is necessary to establish this secure connection.

Bluetooth is a proprietary low-powered wireless technology for short-distance communication. The characteristics of Bluetooth make it a competitive candidate for data communication technology between a host device and other peripheral devices. Before the two devices can communicate, a pairing process has to be done first to establish a secure connection between the two Bluetooth devices. In the pairing process, the devices exchange and establish their common link keys used for the secure connection. The link keys are stored and further connections can be done without user interaction.

The number of devices equipped both with an audio plug interface and Bluetooth technology is expected to increase rapidly. The audio interface can be used for data transfer but the data rate is limited. Bluetooth can support a higher data rate but it is preferable to keep the Bluetooth transceiver off to save power and reduce radiation. Accordingly, there is a need for a simple and efficient way to enable wireless device pairing where control side information is communicated through an alternative channel.

SUMMARY

The invention provides a secure and convenient way to pair Bluetooth devices using an out-of-band (OOB) audio channel.

In general, in one aspect, the invention provides a system of securely paired Bluetooth devices including a host device and a peripheral device. The host device includes an audio interface and a Bluetooth transceiver and the peripheral device includes an audio interface and a Bluetooth transceiver. The host device and the peripheral device are configured to connect to each other by physically connecting their corresponding audio interfaces and to communicate with each other by establishing an out-of-band audio communication channel via the connected audio interfaces. The host device and the peripheral device are configured to exchange Bluetooth authentication data via the out-of-band audio communication channel. The host device and the peripheral device are configured to be subsequently securely paired with each other by establishing an authenticated and cryptographically protected in-band Bluetooth communication channel with each other by turning on and initializing the corresponding Bluetooth transceivers with the corresponding exchanged Bluetooth authentication data.

Implementations of this aspect of the invention may include one or more of the following features. The in-band Bluetooth communication channel between the host device and the peripheral device is established automatically upon detection of the presence of the host device by the peripheral device and vice versa. The Bluetooth authentication data may be authentication code, PIN code, "Bluetooth Device Address", "Simple Pairing Hash C" or "Simple Pairing Randomizer R". Communications between the host device and the peripheral device via the out-of-band audio communication channel are two-way communications and use modulations including Manchester coding, Frequency Shifted Keying (FSK), or Phase-Shifted Keying (PSK). The turning on or off of the Bluetooth transceivers is controlled through the out-of-band audio communication channel to reduce power consumption and radiation by the Bluetooth transceivers. The host device is paired with the peripheral device using Bluetooth pairing protocols including Legacy Pairing, Secure Simple Pairing (SSP), or Out-of-Band (OOB) Pairing. The host and peripheral devices comprise computing devices and the computing devices include desktop computers, mobile phones, personal digital assistants (PDAs), netbooks, tablet computers, notebook computers, electronic readers, digital music players, digital video players, game consoles, or computing circuits. The peripheral device is initially in a sleep mode and the host device is configured to wake up the peripheral device by sending a command via the out-of-band audio communication channel. The command includes frequency tone or data packet. The peripheral device is initially in a sleep mode and is configured to wake itself up by detecting the presence of the host device.

In general, in another aspect, the invention provides a method for securely pairing Bluetooth devices including the following steps. First, providing a host device comprising an audio interface and a Bluetooth transceiver. Next, providing a peripheral device comprising an audio interface and a Bluetooth transceiver. Next, connecting the host device and the peripheral device to each other by physically connecting their corresponding audio interfaces. Next, communicating between the host device and the peripheral device by establishing an out-of-band audio communication channel via the connected audio interfaces. Next, exchanging Bluetooth authentication data between the host device and the peripheral device via the out-of-band audio communication channel. Finally, pairing the host device and the peripheral device with each other by establishing an authenticated and cryptographically protected in-band Bluetooth communication channel with each other. The in-band Bluetooth communication channel is established by turning on and initializing the corresponding Bluetooth transceivers with the corresponding exchanged Bluetooth authentication data.

In general, in another aspect, the invention provides a mobile device. The mobile device includes a Bluetooth transceiver, the Bluetooth transceiver being in an idle power state when not securely paired to a second Bluetooth transceiver of a peripheral device. The mobile device further includes an audio interface, the audio interface coupled to the Bluetooth transceiver, the audio interface configured to connect to a second audio interface of the peripheral device. The mobile device is configured to establish an out-of-band audio communication channel to the peripheral device by connecting the audio interface to the second audio interface, the Bluetooth transceiver transitioning from the idle power state to an operating state in response to the connection of the audio interface to the second audio interface, the mobile device configured to exchange Bluetooth authentication data with the peripheral device via the out-of-band audio communication channel in response to transitioning to the operating state, the mobile device configured to initialize the Bluetooth transceiver with the Bluetooth authentication data to establish an authenticated and cryptographically protected in-band Bluetooth communication channel allowing the mobile device to be securely paired with the peripheral device.

Among the advantages of this invention may be one or more of the following. The system provides a simple and efficient way to enable wireless device pairing where control side information is communicated through an out-of-band audio channel.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

For a more complete understanding, reference is now made to the following description taken in conjunction with the accompanying Drawings in which.

DETAILED DESCRIPTION

The present invention describes a system and the method for pairing between Bluetooth devices using an out-of-band (OOB) audio channel in a simple and secure manner.

The system in the invention includes a host device and a peripheral device where both are equipped with an audio interface and a Bluetooth transceiver. Initially, the host device and the peripheral devices are not paired up yet. The Bluetooth transceivers on both the host device and the peripheral device can be kept in an OFF state to reduce power and radiation. When the host device and the peripheral device want to pair up for communication through the wireless Bluetooth link, they are connected together through the audio interface. Authentication data and other control information necessary for the Bluetooth pairing up are exchanged through the audio interface. When the pairing data are ready, the Bluetooth transceivers on both sides are turned on and initialized with the pairing data to establish an authenticated and cryptographically protected data communication channel.

Figure 1:
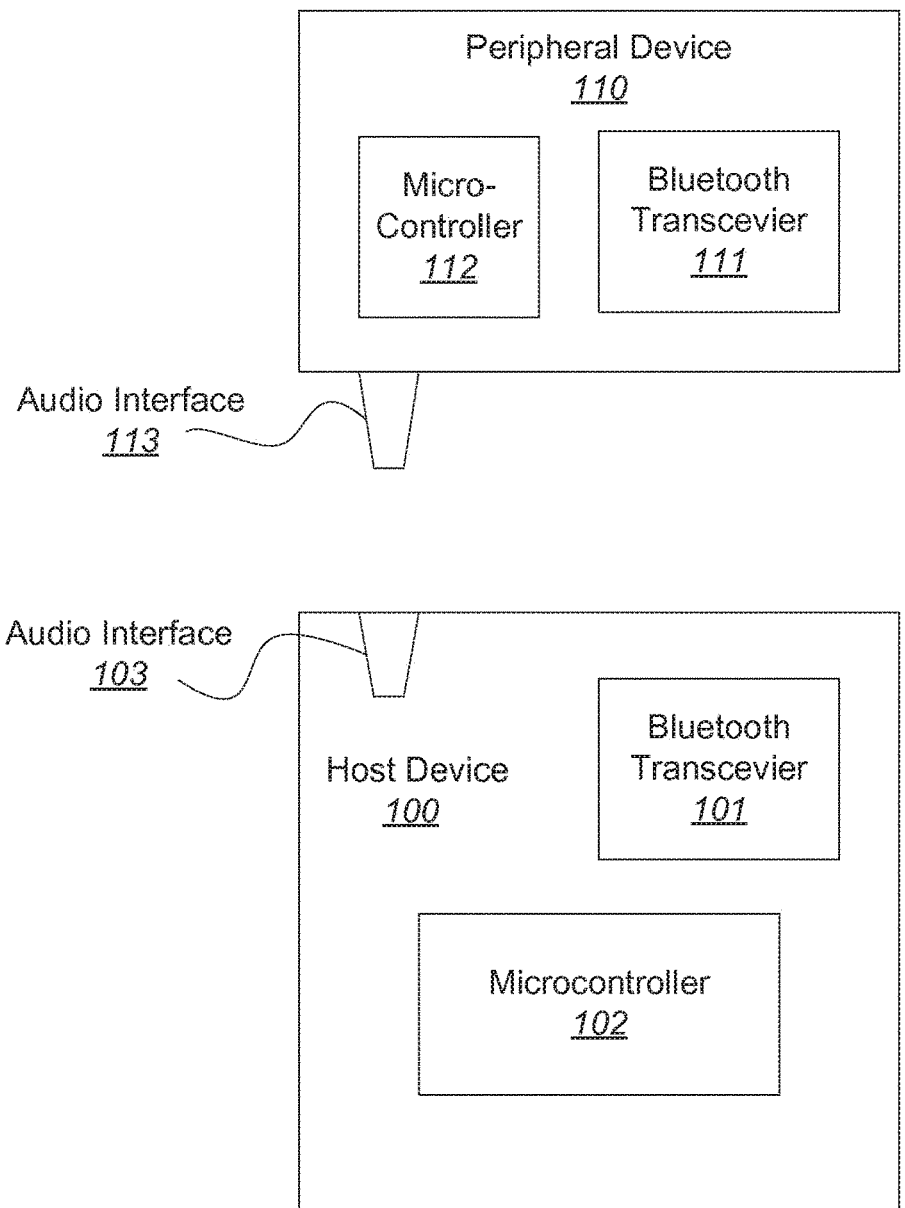
FIG. 1 shows the host device and the peripheral device and both devices are equipped with a Bluetooth transceiver and an audio interface.

FIG. 1 shows the host device 100 and the peripheral device 110. The host device 100 includes a Bluetooth transceiver 101, an audio interface 103, and a microcontroller 102. The microcontroller 102 is responsible for data processing and control among other components within the device 100. The peripheral device 110 includes a Bluetooth transceiver 111, an audio interface 113, and a microcontroller 112. The microcontroller 112 is responsible for data processing and control among other components within the device 110.

The peripheral device 110 is configured to be plugged into the host device 100 and communication occurs over the audio interfaces 113 and 103, respectively, in a wired connection. The peripheral device 110 is also capable of communicating with the host device 100 through a Bluetooth wireless connection. Before the Bluetooth communication can occur, a pairing operation must occur between the two devices where authentication data are exchanged to mutually authenticate one another and establish a common link key to protect the connection cryptographically.

There are two different methods for the pairing: Legacy Pairing and Secure Simple Pairing (SSP). Legacy Pairing, as its name implies, is an older method used in the Bluetooth Core Specifications before version v2.1. In this method, the authentication key is generated by a shared secret PIN code of 1 to 16 bytes in length. The Legacy Pairing method is now considered weak and many devices are using weak PIN codes. For example, many hands-free devices use 0000 or 1234 as the PIN code. Secure Simple Pairing (SSP) is a new pairing method introduced in Bluetooth Core Specifications v2.1 to improve the Legacy Pairing method. SSP is mandatory for any device that implements v2.1 or greater but Legacy Pairing is also required for compatibility reasons. There are four pairing models in SSP depending on the input/output capabilities of the host and peripheral devices: Just Works, Numeric Comparison, Passkey Entry and Out-Of-Band (OOB). In the present invention the method for pairing may be the Legacy Pairing method used before the Bluetooth Core Specifications v2.1 or the Secure Simple Pairing method defined in Bluetooth Core Specifications v2.1.

Figure 2:
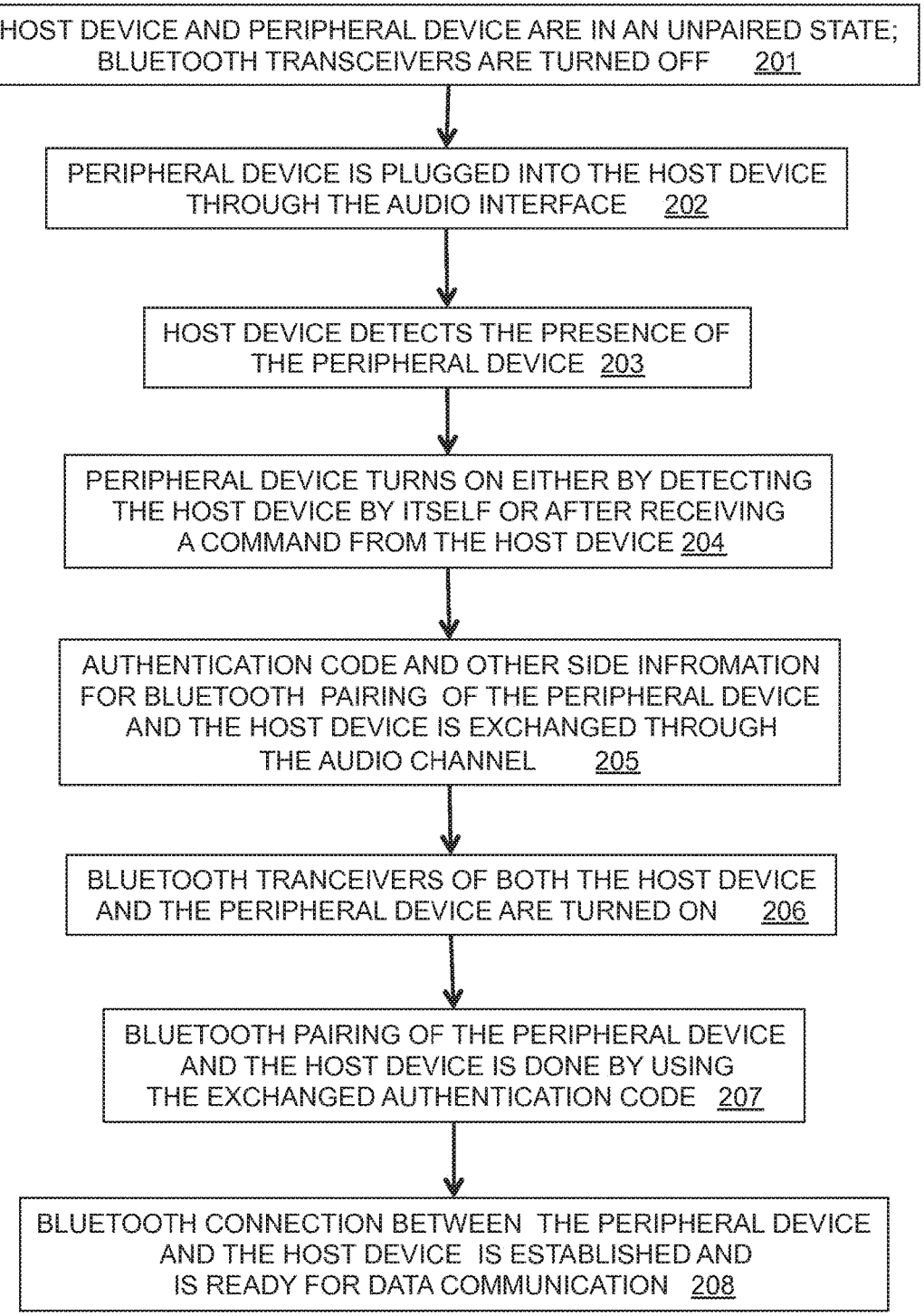
FIG. 2 shows an exemplary operation flow of the Bluetooth pairing process with authentication information exchanged through the audio interface.

FIG. 2 shows an exemplary operation flow where the devices 100 and 110 are paired up. Initially, both the host and the peripheral devices can have their Bluetooth transceivers turned OFF to reduce power consumption (201). The peripheral device 110 can be in a sleep mode. When the peripheral device 110 is plugged into the host device through the audio interface (202), the host device 100 detects the presence of the peripheral device (203). Then the host device 100 can turn on the peripheral device 110 to wake it up through the audio interface by a command in the form of frequency tone or data packet. Alternatively, the peripheral device 110 can wake itself up by detecting the presence of the host device 100, for example, by the presence of a signal in the audio channel such as a frequency tone or a DC bias voltage level (204). Authentication information and other side information are exchanged through the audio interface (205). The information includes Device ID or Bluetooth Device Address, PIN code or Simple Pairing Hash C and Simple Pairing Randomizer R. After this pairing data exchange, the host device 100 and the peripheral device 110 both turn on their Bluetooth transceivers and are initialized with the pairing data (206). The Bluetooth transceivers 101 and 111 then establish the Bluetooth connection by a pairing protocol such as Legacy Paring or Secure Simple Pairing (207). After establishing the data channel, data communication between the two devices can be done through their Bluetooth connection.

Several embodiments of the present invention have been described. Nevertheless, it will be understood that various modifications may be made without departing from the spirit and scope of the invention. Accordingly, other embodiments are within the scope of the following claims.

What is claimed is:

1. A system for securely pairing devices, comprising:
a host device comprising an audio interface and a Bluetooth transceiver; and
a peripheral device comprising an audio interface and a Bluetooth transceiver,
wherein the Bluetooth transceiver of the host device and the Bluetooth transceiver of the peripheral device are in an idle power state when the host device and the peripheral device are not securely paired,
wherein the host device and the peripheral device couple to each other via their corresponding audio interfaces and communicate with each other by establishing an out-of-band audio communication channel through the coupled audio interfaces,
wherein the host device and the peripheral device exchange Bluetooth authentication data via the out-of-band audio communication channel, and
wherein the host device and the peripheral device securely pair with each other based on a pairing protocol by establishing an authenticated and cryptographically protected in-band Bluetooth communication channel with each other and wherein the in-band Bluetooth communication channel is established by:
turning on the Bluetooth transceivers, and
initializing the corresponding Bluetooth transceivers with the corresponding exchanged Bluetooth authentication data.

2. The system of claim 1, wherein the in-band Bluetooth communication channel between the host device and the peripheral device is established automatically.

3. The system of claim 1, wherein communications between the host device and the peripheral device via the out-of-band audio communication channel are performed based on one of Manchester coding, Frequency Shifted Keying (FSK), or Phase-Shifted Keying (PSK).

4. The system of claim 1, wherein the turning on of the Bluetooth transceivers is controlled through the out-of-band audio communication channel.

5. The system of claim 1, wherein the peripheral device is initially in a sleep mode and wherein the host device wakes up the peripheral device with a command.

6. The system of claim 5, wherein the command comprises either a frequency tone or a data packet.

7. The system of claim 1, wherein the peripheral device is initially in a sleep mode and wherein the peripheral device wakes up based on detection of a presence of the host device.

8. A method for securely pairing a first device and a second device, wherein said first device comprises a first audio interface and a first Bluetooth transceiver, and wherein said second device comprises a second audio interface and a second Bluetooth transceiver, said method comprising:
configuring the first device and the second device to couple to each other via their corresponding audio interfaces;
configuring the first device and the second device to communicate with each other by establishing an out-of-band audio communication channel through the coupled audio interfaces;
configuring the first device and the second device to exchange Bluetooth authentication data with each other via the out-of-band audio communication channel; and
configuring the first device and the second device to pair with each other by establishing an authenticated and cryptographically protected in-band Bluetooth communication channel with each other and wherein the in-band Bluetooth communication channel is established by:
turning on the Bluetooth transceivers, and
initializing the corresponding Bluetooth transceivers with the corresponding exchanged Bluetooth authentication data.

9. The method of claim 8, wherein the first device is a host device and the second device is a peripheral device that is initially in a sleep mode,
the method further comprising either:
configuring the host device to wake up the peripheral device from the sleep mode; or
configuring the peripheral device to wake up from the sleep mode based on detecting of presence of the host device.

10. The method of claim 9, wherein the turning on of the Bluetooth transceivers is controlled through the out-of-band audio communication channel.

11. The method of claim 8, wherein the turning on of the Bluetooth transceivers is controlled through the out-of-band audio communication channel.

12. The method of claim 8, wherein communications between the first device and the second device via the out-of-band audio communication channel are performed based on one of Manchester coding, Frequency Shifted Keying (FSK), or Phase-Shifted Keying (PSK).

13. The method of claim 8, wherein the first device and the second device pair with each other based on a Bluetooth pairing protocol.

14. A method for securely pairing a first device and a second device, wherein said first device comprises a first audio interface and a first Bluetooth transceiver, and wherein said second device comprises a second audio interface and a second Bluetooth transceiver, said method comprising:
  enabling the first device and the second device to couple to each other via their corresponding audio interfaces;
  enabling the first device and the second device to communicate with each other by establishing an out-of-band audio communication channel through the coupled audio interfaces;
  enabling the first device and the second device to exchange Bluetooth authentication data with each other via the out-of-band audio communication channel; and
  enabling the first device and the second device to pair with each other by establishing an authenticated and cryptographically protected in-band Bluetooth communication channel with each other and wherein the in-band Bluetooth communication channel is established by:
    turning on the Bluetooth transceivers, and
    initializing the corresponding Bluetooth transceivers with the corresponding exchanged Bluetooth authentication data.

15. The method of claim 14, wherein the first device is a host device, and the second device is a peripheral device that is initially in a sleep mode,
  the method further comprising either:
    enabling the host device to wake up the peripheral device from the sleep mode using a command; or
    enabling the peripheral device to wake up from the sleep mode based on detecting of presence of the host device.

16. The method of claim 15, wherein the host and peripheral devices comprise computing devices.

17. The method of claim 15, wherein the command comprises either a frequency tone or a data packet.

18. The method of claim 14, wherein the Bluetooth authentication data comprises at least one of:
  an authentication code,
  a Personal Identification Number (PIN) code,
  a Bluetooth Device Address,
  a Simple Pairing Hash C, or
  a Simple Pairing Randomizer R.

19. The method of claim 14, wherein said establishing of the in-band Bluetooth communication channel is performed automatically.

20. The method of claim 14, wherein the turning on of the Bluetooth transceivers is controlled through the out-of-band audio communication channel.

* * * * *